US011234383B2

(12) United States Patent
Farley (10) Patent No.: US 11,234,383 B2
(45) Date of Patent: Feb. 1, 2022

(54) APPARATUS FOR GROWING PLANTS

(71) Applicant: JEGOA Ltd., Norwich (GB)

(72) Inventor: Haley Christine Farley, Norwich (GB)

(*) Notice: Subject to any disclaimer, the term of this patent is extended or adjusted under 35 U.S.C. 154(b) by 288 days.

(21) Appl. No.: 16/469,481

(22) PCT Filed: Dec. 13, 2017

(86) PCT No.: PCT/EP2017/025361
§ 371 (c)(1),
(2) Date: Jun. 13, 2019

(87) PCT Pub. No.: WO2018/108324
PCT Pub. Date: Jun. 21, 2018

(65) Prior Publication Data
US 2019/0380285 A1    Dec. 19, 2019

(30) Foreign Application Priority Data
Dec. 13, 2016   (GB) ..................................... 1621169

(51) Int. Cl.
*A01G 27/02*   (2006.01)
*A01G 13/04*   (2006.01)
(Continued)

(52) U.S. Cl.
CPC ............ *A01G 27/02* (2013.01); *A01G 13/043* (2013.01); *A01G 13/105* (2013.01); *A01G 2013/006* (2013.01)

(58) Field of Classification Search
CPC .................................................... A01G 27/02
See application file for complete search history.

(56) References Cited

U.S. PATENT DOCUMENTS

| 129,451 | A | * | 7/1872 | Baldwin | ................ A01G 27/02 47/79 |
| 1,383,368 | A | * | 7/1921 | Ambrose | ............... A01G 27/02 47/79 |

(Continued)

FOREIGN PATENT DOCUMENTS

| CA | 2275673 A1 | * | 12/1999 | ............. A01G 27/02 |
| DE | 29913673 U1 | * | 5/2000 | ............. A01G 27/02 |

(Continued)

OTHER PUBLICATIONS

Joelle Dagnelies, International Search Report received for International Patent Application No. PCT/EP2017/025361, dated May 18, 2018, 6 pages.

(Continued)

*Primary Examiner* — Jessica B Wong (57) ABSTRACT

An apparatus for growing plants (100) is provided. The apparatus comprises at least one base member (110) having a periphery (112), at least one cover member, or wall member (120), having at least one channel (122a, 122b), and at least one intermediate filter (170) operable to be supported by the at least one cover member (120). The one or more cover members (120) are couplable to the periphery (112) of the at least one base member for providing a hollow space (140), and the at least one channel is operable to receive at least one tubular member (160, 162) supported at a distance from the at least one base member. The at least one intermediate filter is arranged for dividing the hollow space into at least two segments (172, 174). The apparatus is optionally operable to provide irrigation of one or more plants growing therein from seawater supplied to a bottom region of the apparatus.

20 Claims, 3 Drawing Sheets

(51) Int. Cl.
  *A01G 13/10* (2006.01)
  *A01G 13/00* (2006.01)

(56) References Cited

U.S. PATENT DOCUMENTS

| | | | | |
|---|---|---|---|---|
| 2,288,678 | A * | 7/1942 | Blumentritt | A01G 27/02 47/79 |
| 2,387,340 | A * | 10/1945 | Moriarty | A01G 27/02 47/79 |
| 5,272,835 | A * | 12/1993 | Stern | A01G 27/02 47/79 |
| 5,299,384 | A | 4/1994 | Andrews | |
| 5,921,025 | A | 7/1999 | Smith | |
| 6,584,730 | B1 * | 7/2003 | Mai | A01G 27/02 47/48.5 |
| 6,691,460 | B1 * | 2/2004 | Lee | A01G 27/02 47/79 |
| 9,930,840 | B1 * | 4/2018 | Gergek | A01G 27/02 |
| 2013/0067812 | A1 * | 3/2013 | Masters | A01G 27/02 47/81 |
| 2013/0212940 | A1 | 8/2013 | Blyden | |
| 2014/0259914 | A1 * | 9/2014 | Tsai | A01G 9/02 47/65.7 |
| 2016/0150746 | A1 * | 6/2016 | Wood | A01G 27/04 47/81 |
| 2018/0084743 | A1 * | 3/2018 | Thomas | A01G 9/02 |

FOREIGN PATENT DOCUMENTS

| | | |
|---|---|---|
| EP | 0591474 A1 | 4/1994 |
| FR | 2492627 B1 | 8/1984 |
| GB | 2517892 A | 3/2015 |
| KR | 20130004813 A | 1/2013 |
| WO | 2010028445 A1 | 3/2010 |

OTHER PUBLICATIONS

Joelle Dagnelies; Written Opinion for International Patent Application No. PCT/EP2017/025361, dated May 18, 2018, 6 pages.

* cited by examiner

APPARATUS FOR GROWING PLANTS

TECHNICAL FIELD

The present disclosure relates to apparatus for growing plants, for example for growing plants providing at least one of fruits and vegetables; moreover, the present disclosure relates to methods of (for) forming and using such apparatus.

BACKGROUND

Increasing populations, particularly in urban settlements such as cities, has created an increased demand for food, such as fruits and vegetables. Furthermore, due to a lack of suitable plots of land and clean water in the aforementioned cities, it has become difficult to grow food locally in the cities. Thus, fruits and vegetables are usually grown at locations away from the cities, for example in countryside regions, and thereafter transported to the cities using vehicles. This increases the cost of fruits and vegetables due to associated transportation charges, and may pose an environmental threat due to emission of greenhouse gases and particulate pollutants by the vehicles. There are therefore encountered problems when seeking to supply fruit and vegetables to the cities.

The above problems may be potentially addressed by growing plants at communal plots or by using conventional plant growing apparatus, such as flower pots or plastic bags provided with pre-planted seeds. The use of communal plots is associated with problems of size restriction due to a large number of people sharing a given associated communal plot, and generally such communal plots are not hygienically maintained to such an extent that is suitable for growing food, for example fruits and vegetables; for example, use of contaminated water for irrigation can cause cholera and poisoning. Moreover, the use of conventional plant growing apparatus, such as flower pots or plastic bags, does not provide a sufficiently high yield or sufficiently high production efficiency. Therefore, for obtaining a higher degree of production or a required production, a large number of such plant growing apparatus may be potentially required. However, such plant growing apparatus are associated with transportation problem, when transported in large numbers, due to their size and non-foldable nature.

Therefore, in order to address the aforementioned problems, there arises a need to provide improved apparatus that address aforementioned drawbacks of conventional ways for growing plants.

SUMMARY

In a first aspect, an embodiment of the present disclosure provides an apparatus for growing plants comprising:
 at least one base member having a periphery;
 at least one cover member having at least one channel;
 wherein the at least one cover member (namely, 'wall member') are couplable to the periphery of the at least one base member for providing a hollow space, and wherein the at least one channel is operable to receive at least one tubular member supported at a distance from the at least one base member;
 and
 at least one intermediate filter operable to be supported by the at least one cover member, wherein the at least one intermediate filter is arranged for dividing the hollow space into at least two segments;
 wherein the at least one cover member comprising
 a first sheet and a second sheet, wherein the first and second sheets are couplable along at least of their lateral peripheral edges for forming the at least one channel therebetween,
 wherein the second sheet comprises at least one corner-cutout portion for creating at least one opening for a bottom portion of the at least one tubular member when received within the at least one channel.

The apparatus of the present disclosure addresses problems associated encountered with conventional ways for growing plants, for example fruits and vegetables. The apparatus can be easily transported in large numbers due to its flat-pack nature (or foldable nature). Furthermore, the apparatus also addresses an issue of land availability for growing fruits and vegetables, as the apparatus can be suitably and locally used around or at residential places, such as in balconies, terraces, corridors and the like. Therefore, the use of the apparatus enables in attaining an increased, for example required, production of fruits and vegetables. Furthermore, growing fruits and vegetables locally using the apparatus may address the issue of increasing demand of food and emissions of greenhouse gas in the cities. Optionally, the apparatus is operable to provide irrigation of one or more plants growing therein from seawater supplied to a bottom region of the apparatus.

Optionally, the at least one intermediate filter includes a filter layer for dividing the hollow space into at least two segments.

Optionally, the apparatus for growing plants further comprising an intermediated perforated tube arrangement having a perforated tube, and
a perforated sleeve operable to receive the perforated tube therein,
wherein the intermediated perforated tube arrangement is snugly received by a pair of mutually opposite holes of the at least one cover member and supported by the intermediate filter.

More optionally, the first and second sheets have a length that is at least 10% longer than a peripheral length of the at least one base member for allowing overlap of the lateral peripheral edges of the first and second sheets.

Optionally, the at least one cover member further comprising a plurality of through-holes. The plurality of through-holes are configured at a distance from the at least one base member.

Optionally, the at least one base member has a circular or an oval or a polygonal shape.

Optionally, the at least one cover member and the at least one base member are made of a permeable material.

More optionally, the permeable material comprises one of a woven fabric and a non-woven fabric.

Optionally, the at least one cover member is made of an impermeable material.

More optionally, the impermeable material comprises one of a plastics material, leather, and rubber.

Optionally, the at least one intermediate filter is a mesh made of a metal or a plastics material.

Optionally, the apparatus further comprising at least one lid couplable to the at least one cover member for closing and opening the hollow space, wherein the lid and the at least one cover member comprises a fastening arrangement for coupling the least one lid to the least one cover member.

Optionally, the apparatus further comprising one or more handle arranged on the at least one cover member for lifting and carrying the apparatus.

Optionally, the apparatus further comprising at least one funnel member operable to be arranged on the at least one tubular member.

Optionally, the apparatus further comprising at least one slug repellent arranged on the cover member.

In another aspect, an embodiment of the present disclosure provides a method for forming the apparatus, the method comprising steps of:

coupling the overlapped lateral peripheral edges of the first and second sheets of the at least one cover member to form the at least one channel therebetween;

coupling the at least one cover member to the periphery of the at least one base member to extend from the at least one base member and to form the hollow space;

inserting the at least one tubular member through the at least one channel for being snugly received by the at least one channel to support the at least one tubular member at the distance from the at least one base member; and coupling the at least one intermediate filter layer to the at least one cover member for being arranged within the hollow space to divide the hollow space into the at least two segments.

Optionally, the coupling of the overlapped lateral peripheral edges of the first and second sheets of the at least one cover member is performed by one of stitching, stapling, zippers, gluing, Velcro™ and hot sealing.

More optionally, the coupling of the at least one cover member to the periphery of the at least one base member is performed by one of stitching, stapling, zippers, gluing and hot sealing.

Optionally, the method further comprising coupling the at least one lid to the at least one cover member, and coupling the one or more handle to the at least one cover member.

Optionally, the method further comprising:
creating the pair of mutually opposite holes on the at least one cover member, and
inserting the intermediate perforated tube arrangement into the pair of mutually opposite holes for being supported by the intermediate filter.

In yet another aspect, an embodiment of the present disclosure provides a method of using the apparatus, the method comprising steps of:

filling a segment, closed to the at least one base member, of the hollow space with at least small stones and sand;

placing the intermediate filter on top of the at least small stones and sand;

filling a segment, away from the at least one base member, of the hollow space with at least soil and fertilizer; and planting seeds in the segment filled with the soil and fertilizer.

Optionally, the method further comprising placing the intermediate perforated tube arrangement into the pair of mutually opposite holes.

More optionally, the method further comprising watering the seeds with the help of the at least one tubular member and the at least one funnel member.

In yet another aspect, an embodiment of the present disclosure provides a kit for growing plant comprising the apparatus and a bag for accommodating and carrying the apparatus in an unassembled state thereof.

Embodiments of the present disclosure substantially eliminate or at least partially address the aforementioned problems in the prior art, and provides an apparatus for growing plants.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of describing embodiments of the present disclosure, exemplary constructions of the embodiment are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DRAWINGS

Figure 1:
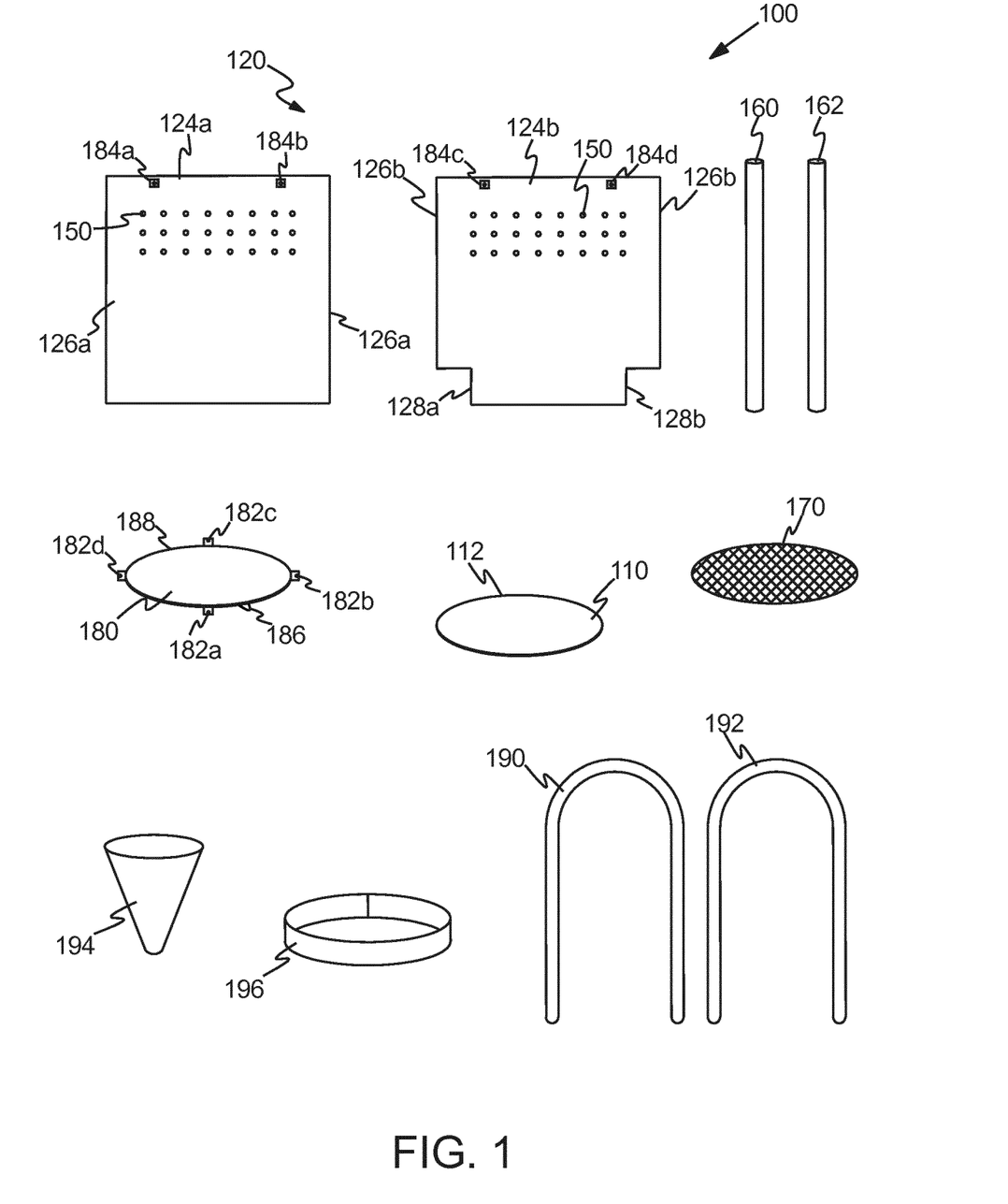
FIG. 1 is a schematic illustration of an apparatus for growing plants in an unassembled state, according to an embodiment of the present disclosure.
Figure 2:
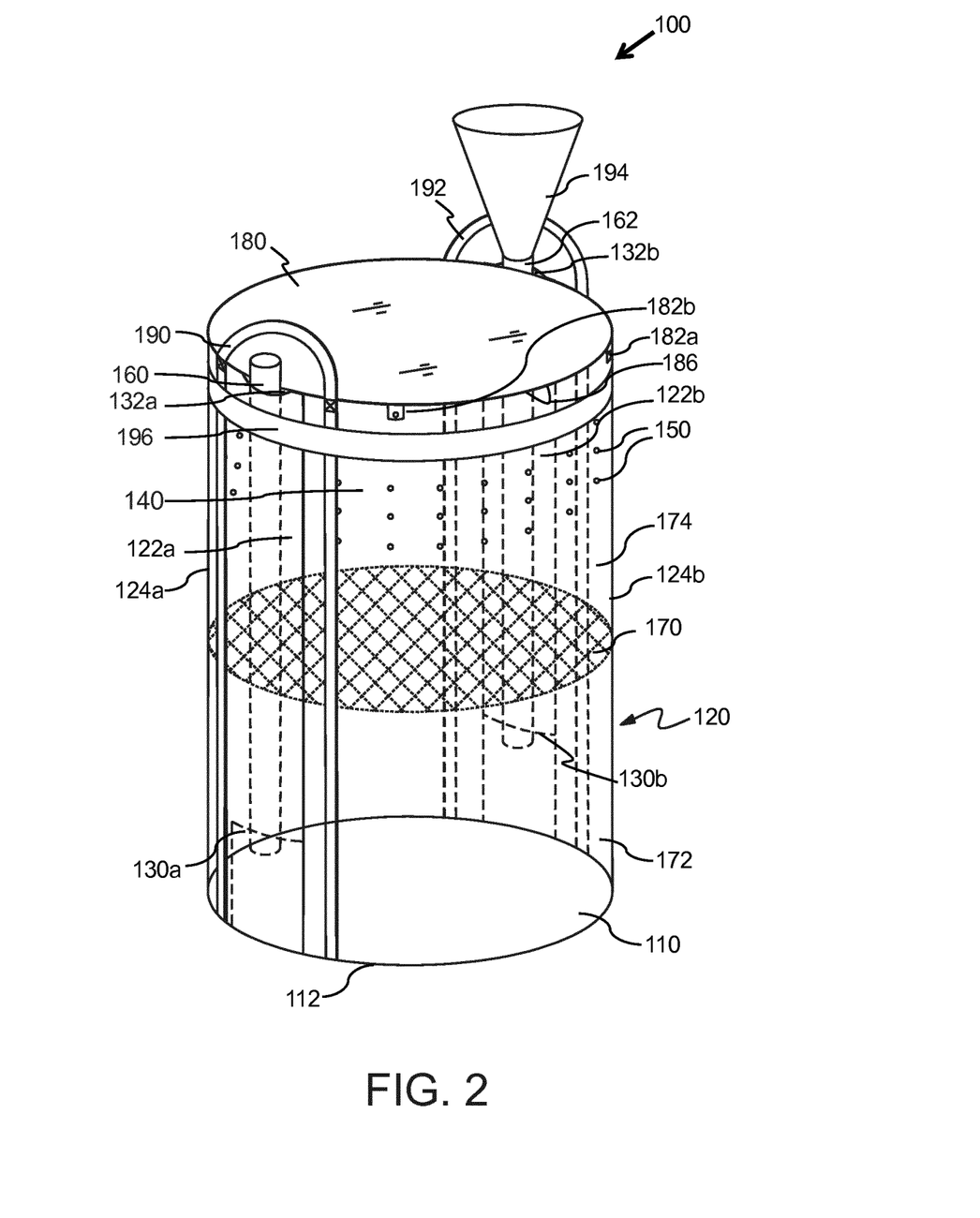
FIG. 2 is a schematic illustration of the apparatus of FIG. 1 in an assembled state, according to an embodiment of the present disclosure.

Referring to FIGS. 1 and 2, there are shown therein schematic illustrations of an apparatus 100 for growing plants, according to an embodiment of the present disclosure. Specifically, in FIG. 1, there is shown an illustration of the apparatus 100 in an unassembled state, whereas in FIG. 2, there is shown the apparatus 100 in an assembled state.

The apparatus 100 includes at least one base member 110 having a periphery 112; the at least one base member 110 is shown to be planar. The periphery 112 of the base member 110 defines a shape and a size of the base member 110. As shown, the base member 110 includes a circular shape defined by the periphery 112. However, the base member 110 may be configured to have other shapes, such as an oval shape or a polygonal shape, which may be defined by the peripheries thereof. When the periphery 112 is optionally oval in shape, wherein associated minimum and maximum oval radii are optionally less than 3:1 in ratio, more optionally less than 2:1 in ratio, and most optionally less than 1.5:1 in ratio; when the ratio is 1:1, the oval shape becomes circular. When polygonal in shape, the at least one base member can be, for example, hexagonal, heptagonal, octagonal, nonagonal and so forth. Optionally, sides of such a polygonal shape are not mutually similar, enabling the at least one base member 110 to be rotationally non-symmetrical about a central axis normal to a plane of the at least one base member 110.

In one example embodiment, the base member 110 has a diameter in a range of 10 cm to 200 cm (cm=centimetres, wherein 2.54 cm=1 inch), more preferably in a range of 20 cm to 100 cm, and most preferably substantially 75 cm; by "substantially", for example, is meant within +/−20%, more optionally +/−10%. Furthermore, the base member 110 is made of a permeable material. For example, the permeable material includes one of a woven fabric (such as nylon) and a non-woven fabric; for example, the permeable material is fabricated from a woven fabric or a non-woven fabric, or a combination of a woven fabric and a non-woven fabric. In an example, the base member 110 may be manufactured from a reinforced nylon webbing, polyester webbing, reconstituted plant material webbing (for example Rayon®), an organic webbing that is biodegradable over a longer period (for example, over a period of several years when disposed of in a land-fill site). Moreover, the base member 110 may be made of a flat and rigid sheet of porous material, such as clay and soil. In another embodiment, the base member 110 may be made of an impermeable material, such as plastic, leather, rubber, or any combination of leather and rubber; optionally, the rubber is produced from recycling automobile tires ("tyres") and innertubes. More optionally, the base member 110 is fabricated from recycled and reprocessed fibers (fibres) from articles of human clothing. In such an instance, the base member 110 may be provided with one or more through holes. The through holes optionally have a size, for example diameter, of a few millimetres (mm), such as in a range of 2 mm to 10 mm. Optionally, the through holes are substantially circular, but are alternatively or additional implemented as elongate holes (for example elongate slits).

The apparatus 100 also includes at least one cover member 120 having at least one channel, for example a single channel, two channels, more than two channels and so forth. In one embodiment, as shown in FIG. 2, the cover member 120 includes a pair of channels 122a and 122b. Specifically, the cover member 120 includes a first sheet 124a and a second sheet 124b, wherein the sheets 124a, 124b are most clearly shown in FIG. 1. The first sheet 124a and the second sheet 124b are couplable (namely attachable, adapted to be attached. operable to be coupled) along at least a part of their peripheral edges 126a and 126b (shown in FIG. 1) for forming the channels 122a and 122b therebetween (most clearly shown in FIG. 2). For example, the first and second sheets 124a, 124b are four-edged structures, such as rectangular sheets (or square sheets), and thereof their parallelly (namely, in a parallel manner) spaced apart peripheral edges 126a, 126b are arranged to overlap on each other. Thereafter, the overlapped peripheral edges 126a, 126b are coupled (namely attached) to each other for forming the channels 122a and 122b therebetween.

As shown, both the first and second sheets 124a, 124b are rectangular sheets, however, the second sheet 124b includes at least one corner-cutout portion, such as corner-cutout portions 128a, 128b. The corner-cutout portions 128a, 128b enable at least one opening to be created, such as openings 130a, 130b (shown in FIG. 2), wherein overlapping peripheral edges 126a, 126b are coupled (namely attached) to each other. Specifically, the openings 130a, 130b (may be first openings) opposite to second openings 132a, 132b, and associated with the channels 122a, 122b respectively.

In one embodiment, the cover member 120 (namely, the first and second sheets 124a, 124b) is made of an impermeable material. By "impermeable" is meant, for example, impermeable to both water and gases; alternatively, by "impermeable" is meant impermeable to water but allowing a small degree of gas diffusion therethrough. In contradistinction, in contradistinction to "impermeable", a "permeable" material allows rapid exchange of water and gases therethrough, for example in a matter of minutes or hours. The impermeable material may include, but not limited to, plastics materials, leather, rubber or any combination thereof. For example, the first and second sheets 124a, 124b may be a manufactured from a flexible sheet of plastics material, leather or rubber material. Alternatively, the cover member 120 may be made of a permeable material. For example, the permeable material may include, but not limited to at least one of a woven fabric and a non-woven fabric, or a combination of a woven fabric and a non-woven fabric. Furthermore, the cover member 120 may be made of a same material as that of the base member 110, otherwise the cover member 120 and the base member 110 may be made of mutually different materials.

The cover member 120 (namely when the first and second sheets 124a, 124b are coupled to each other) forms a hollow cylindrical structure (or a generally cylindrical structure, for example a faceted cylindrical structure) having a diameter that is generally similar to the diameter of the base member 110, namely in a range of 10 cm to 200 cm, more preferably in a range of 20 cm to 100 cm, and most preferably 75 cm (for example, as aforementioned). Specifically, each of the first and second sheets 124a, 124b includes a length (along their peripheral edges adjacent to the peripheral edges 126a, 126b) at least 10% longer than a half of a peripheral length (namely a length of the periphery 112) of the base member 110 for allowing an overlap of the peripheral edges 126a, 126b of the first and second sheets 124a, 124b. Furthermore, the cover member 120 also includes a length (namely a length of the peripheral edges 126a, 126b) larger compared to the diameter of the base member 110, namely in a range of 15 cm to 250 cm, more preferably in a range of 30 cm to 125 cm, and most preferably 100 cm; "substantially", for example, is to be construed as defined in the foregoing.

The cover member 120 is couplable (namely attachable, namely adapted to be attached) to the periphery 112 of the base member 110 for providing a hollow space 140, as shown in FIG. 2. Specifically, when the hollow cylindrical cover member 120 (formed by the first and second sheets 124a, 124b coupled to each other) is coupled to the circular base member 110, the hollow space 140 is formed. The hollow space 140 is closed from one side (by the base member 110) and open from the other side. The cover member 120 also includes a plurality of through-holes 150, wherein the through-holes 150 are configured (namely arranged or disposed) on the first and second sheets 124a, 124b (as shown in FIG. 1). Furthermore, the plurality of through-holes 150 are configured at a distance (for example, accommodated in a range of 2 cm to 25 cm) from the base member 110 (as shown in FIG. 2).

The apparatus 100 also includes at least one tubular member, such as tubular members 160, 162; optionally, the tubular members 160, 162 are fabricated from a woven material, alternatively fabricated from a non-woven material, or fabricated from a combination of a woven and non-woven material. The channels 122a, 122b are operable to receive the tubular members 160, 162, respectively (as shown in FIG. 2) and supported at a distance from the base member 110. In such an example, the corner-cutout portions 128a, 128b form the openings 130a, 130b for bottom portions of the tubular members 160, 162 to be received within the channels 122a and 122b. The tubular members 160, 162 are hollow elongated structures made of any suitable material, such as plastic, metal or any combination thereof. Furthermore, a length of the tubular members 160, 162 may be smaller as compared to the length of the cover member 120, for example in range of 12 cm to 80 cm, based on the length of the cover member 120.

The apparatus 100 also includes at least one intermediate filter, such as an intermediate filter 170. The intermediate filter 170 is operable (namely configured, namely adapted) to be supported by the cover member 120. Furthermore, the intermediate filter 170 is arranged for dividing the hollow space 140 into at least two segments, such as a first segment 172 adjacent to the base member 110 and a second segment 174 away (namely remote) from the base member 110. In an example embodiment, the intermediate filter 170 includes a filter layer for dividing the hollow space 140 into the first segment 172 and the second segment 174. For example, the intermediate filter 170 may be a filter layer of sand that is in a range of 2 cm to 15 cm thick, for example 50 mm thick, and spaced apart from the base member 110. The filter layer of sand is optionally covered with a layer of plastics material, for example polypropylene, and coupled to the cover member 120. Alternatively, the intermediate filter is a mesh (or a perforated structure) made of a metal or a plastics material, or a combination of a metal and a plastics material.

The apparatus 100 also includes at least one lid, such as a lid 180, couplable (namely attachable, namely configured to be attached) to the cover member 120 for closing and opening the hollow space 140. The lid 180 may be a rigid planner structure or a flexible planner structure, for example a substantially planar structure, which is detachably or permanently coupled to the cover member 120, and positioned opposite to the base member 110; for example the lid 180 is provided at a top portion of the apparatus 100 when deployed, and the base member 110 is provided at a bottom portion of the apparatus 100 when deployed, as illustrated. Furthermore, the lid 180 is coupled to the cover member 120 using a fastening arrangement. For example, the fastening arrangement may be a snap-fit button arrangement, a micro-hook coupling arrangement (for example Velcro®), a press-stud attachment or similar. As shown in FIG. 1, the fastening arrangement includes a plurality of buttons 182a, 182b, 182c and 182d arranged on the lid 180 and a plurality of button-snaps 184a, 184b, 184c and 184d (corresponding to the plurality of buttons 182a, 182b, 182c and 182d) arranged on the cover member 120 (namely, on the first and second sheets 124a, 124b). Furthermore, the lid 180 also includes a lip 186, which enables in lifting the lid 180 for closing and opening the hollow space 140. As shown, the lid 180 is manufactured to be of a circular shape defined by a periphery 188; alternatively, the lid 180 is oval or polygonal in shape; yet alternatively, the lid 180 is conical in shape, frusto-conical in shape, inverted conical in shape so that condensate arising on the lid 180 drips back into the apparatus 100 for irrigation purposes. In an example embodiment, a length of the periphery 188 of the lid 180 is the same (for example, substantially the same) as the length of the periphery 112 of the base member 110. Alternatively, the lid 180 may be configured to have other shapes, such as an oval or a polygonal shape as aforementioned, but essentially larger in size as compared diameter of the cover member 120. Additionally, the at least one lid 180 may be made of metal or clear plastics material. Optionally, the at least one lid 180 is manufactured from an optically opaque material. Optionally, the at least one lid 180 is manufactured from an optically transmissive material (for example transmitting more than 75% of incident optical electromagnetic radiation thereon). Optionally, the at least one lid 180 is fabricated from a material whose transmissivity is dependent upon electromagnetic wavelength so that infrared radiation within the apparatus 100 is reflected back into the apparatus 100 whereas incident sunshine on the apparatus 100 is efficiently transmitted through the at least one lid 180 into an interior region of the apparatus 100. Yet alternatively, the at least one lid 180 is fabricated from a material that is highly transmissive to infrared radiation to ensure that the apparatus 100 is efficiently cooled when employed in equatorial environments; in such a case, the at least one lid 180 is fabricated from a plurality of layers, wherein a subset of the layers are metallic to provide wavelength selective transmission and reflection, or provided with wavelength selective microgrid arrays to provide wavelength selective transmission and reflection.

The apparatus 100 also includes one or more handles, wherein such one or more handles 190, 192 are arranged on the cover member 120, for example attached or attachable to the cover member 120. As shown, the handles 190, 192 are coupled to the cover member 120 and above the channels 122a and 122b; for example, in particular, the handles 190, 192 are coupled to both the first and second sheets 124a, 124b (above overlapped peripheral edges 126a, 126b) and extend throughout the length of the cover member 120. The handles 190, 192 may be manufactured, for example, from a fabric, a plastics material, leather, rubber or any combination thereof. For example, the handles 190, 192 may be fabric tapes, such as nylon webbing. The handles 190, 192 enable the apparatus 100 to be lifted and carried when in an assembled state.

The apparatus 100 also includes at least one funnel member, such as a funnel member 194, which may be operable to be arranged on at least one of the tubular members 160, 162, for example on the tubular member 160 or the tubular member 162, or both. As shown in FIG. 2, the funnel member 194 is arranged on the tubular member 162. The funnel member 194 may be made of an impermeable material. The impermeable material may include, but is not limited to, a plastic material, leather, rubber or any combination thereof. In use (namely in operation), the funnel member 194 enables pouring of water through the tubular member 162.

The apparatus 100 further includes at least one slug repellent 196 arranged on the cover member 120. The slug repellent 196 is attached at an upper portion, of the cover member 120, away from the base member 110. The slug repellent 196 may be a flat sheet (or tape) made of a metal or a plastics material. In an example, the slug repellent 196 may be a copper tape or a copper strip. The copper tape or copper strip can be beneficially used to protect the plants from slugs, worms, and other similar pests that may hamper the growth of plants. Optionally, alloy of copper is employed.

The present disclosure further relates to a method of (for) manufacturing, for example forming, the apparatus 100. The method comprises a step of coupling the overlapped lateral peripheral edges 126a, 126b of the first and second sheets 124a, 124b of the at least one cover member 120 to form the at least one channel, such as the channels 122a, 122b therebetween. Optionally, the step of coupling the overlapped lateral peripheral edges 126a, 126b of the first and second sheets 124a, 124b of the cover member 120 is performed by one of stitching, stapling, zippers, gluing, such that the channels 122a, 122b are formed between the overlapped lateral peripheral edges 126a, 126b of the first and second sheets 124a, 124b. Optionally, the step of coupling the overlapped lateral peripheral edges 126a, 126b of the first and second sheets 124a, 124b is implemented by employing hot sealing of the lateral peripheral edges 126a, 126b together. In yet another optional example, the step of coupling the overlapped lateral peripheral edges 126a, 126b of the first and second sheets 124a, 124b of the cover member 120 is performed by employing heat welding.

Furthermore, the method of (for) forming the apparatus 100 includes a step of coupling the cover member 120 to the periphery 112 of the base member 110, such that the base member 110 extends from the base member 110 and forms the hollow space 140. The step of coupling the cover member 120 to the periphery 112 of the base member 110 is performed by one of stitching, stapling, zippers, gluing and hot sealing.

Thereafter, the method of (for) forming the apparatus 100 includes inserting the tubular members 160, 162 through the channels 122a, 122b (respectively) for being snugly received by the channels 122a, 122b and to support the tubular members 160, 162 at the distance from the base member 110. The channels 122a, 122b allow the tubular members 160, 162 to be placed therein, such that there is no or little lateral movement of the tubular members 160, 162 with respect to the channels 122a, 122b; by "no or little lateral movement" is meant less than 10 mm flexible slack, more optionally less than 5 mm flexible slack.

The method for forming the apparatus 100 also includes a step of coupling the intermediate filter 170 to the cover member 120 for being arranged within the hollow space 140. For example, the step includes arranging for the intermediate filter 170 to be hingedly coupled (or coupled along a small portion thereof) to the cover member 120, such that intermediate filter 170 can be lifted or move with respect to the cover member 120. The intermediate filter 170 is arranged at a distance from the base member 110 for dividing the hollow space 140 into the first segment 172 and the second segment 174, for example as aforementioned wherein "distance" is defined. The intermediate filter 170 is therefore operable to open or close the first segment 172.

The present disclosure also relates to a method of (for) using the apparatus 100. The method comprises steps of filling a segment, spatially close to the base member 110 (namely the first segment 172) of the hollow space 140 with at least small stones and sand; by "small" is meant, for example, having a diameter of less than 15 mm, more optionally less than 10 mm. Thereafter, the method includes placing the intermediate filter 170 on top of the at least small stones and sand. Furthermore, the method includes filling a segment, away (remote) from the base member 110 (namely the second segment 174) of the hollow space 140 with at least soil and fertilizer; the soil is, for example, compost, peat, clay soil, silt, mud or similar; the fertilizer includes, for example, a mixture of nitrates, phosphates and trace minerals. Thereafter, the method includes planting the seeds in the segment filled with the soil and fertilizer (namely the second segment 174). In another example embodiment, the first segment 172 may be filled with the soil and fertilizer, in addition to small stones and sand, and planted with the seeds. In such an example, the intermediate filter 170 may include large perforations or holes for allowing the plants to grow therethrough; by "large" is meant, for example, in a range of 2 mm to 50 mm in diameter, more optionally in a range of 5 mm to 30 mm in diameter, and yet more optionally substantially 25 mm in diameter; optionally, the perforations or holes are circular, oval or elongate slits. The method further comprises watering the seeds with the help of the tubular members 160, 162 and the funnel member 194. It is to be understood that the method also includes providing sunlight or artificial light required for growing plants from the planted seed. The apparatus 100 accordingly enables fruits and vegetables to be provided from the planted seeds.

Figure 3:
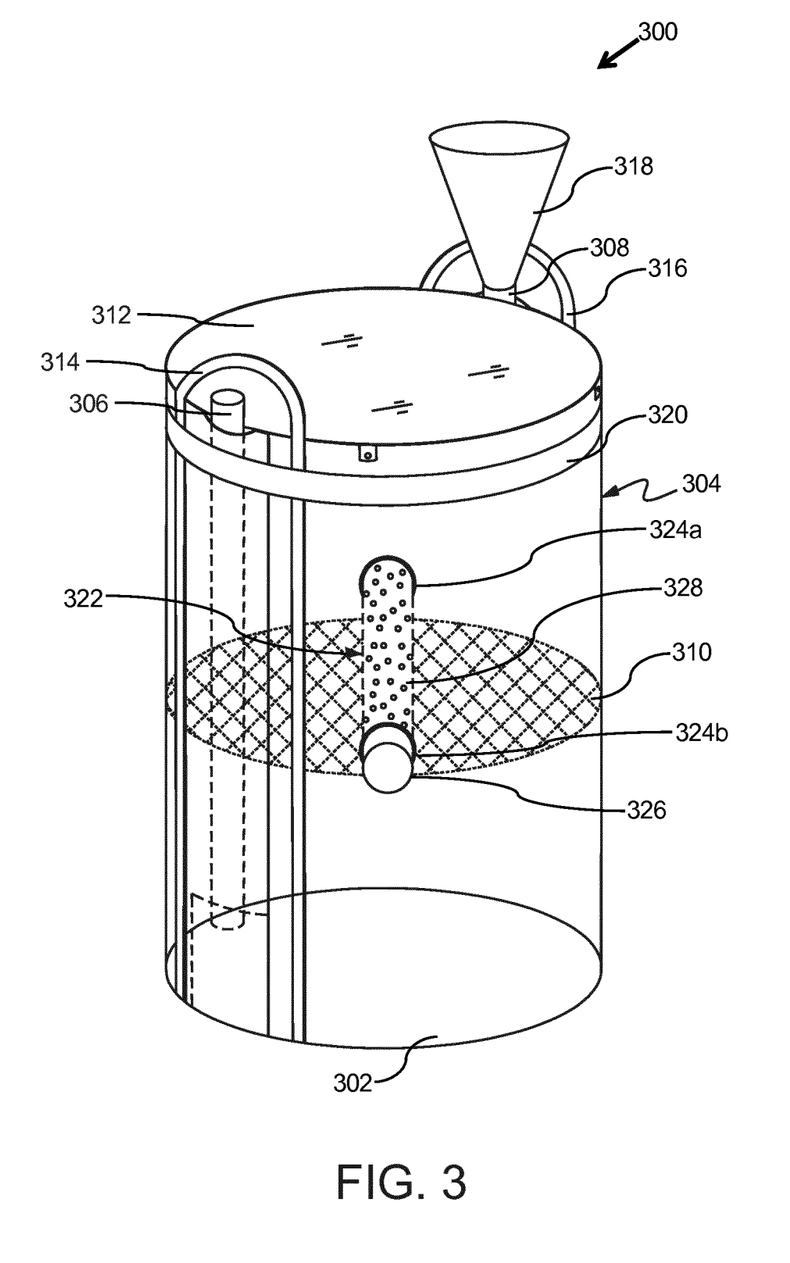
FIG. 3 is a schematic illustration of an apparatus in an assembled state, according to another embodiment of the present disclosure.

Referring now to FIG. 3, there is shown a schematic illustration of an apparatus 300 in an assembled state, according to another embodiment of the present disclosure. The apparatus 300 is substantially structurally and functionally similar to the apparatus 100, explained in conjunction with FIGS. 1 and 2. For example, the apparatus 300 includes a base member 302, a cover member 304, tubular members 306, 308, an intermediate filter 310, a lid 312, handles 314, 316, a funnel member 318, and a slug repellent 320. Additionally, the apparatus 300 includes an intermediated perforated tube arrangement 322 snugly received by a pair of opposite-holes 324a, 324b created on the cover member 304; "snugly" is to be construed as aforementioned, for example. The pair of holes 324a, 324b is arranged above the intermediate filter 310, such that the intermediated perforated tube arrangement 322 is supported by the intermediate filter 310. Furthermore, a length of the intermediated perforated tube arrangement 322 may be equal to, or longer than, a width of the cover member 304.

As shown in FIG. 3, the intermediated perforated tube arrangement 322 includes a perforated tube 326 and a perforated sleeve 328. The perforated tube 326 is a hollow elongated structure made of a suitable material, such as plastic, metal or any combination thereof; optionally, at least one of, or both, the perforated tube 326 and the perforated sleeve 328 is fabricated from a woven material, wherein a weave employed provides for such perforations. The perforated tube 326 may be configured to have various surface shapes, such as uniform or corrugated. Furthermore, the perforated sleeve 328 is operable to receive the perforated tube 326 therein. The perforated sleeve 328 may be a layer or a membrane made of any suitable material, such as plastics material, metal or any combination thereof. The perforated tube 326 and the perforated sleeve 328 together (namely the intermediated perforated tube arrangement 322) constitute a perforated structure that allows air to circulate around roots enabling better growth of an associated root ball. Additionally, the intermediated perforated tube arrangement 322 may enable drainage of excess water from the apparatus 300. Moreover, the perforated sleeve 328 may be used for controlling air flow within the apparatus 300, wherein such a control is achieved by tucking fabric into ends of the perforated tube 326 (or by keeping the ends open).

As described above, the present disclosure further relates to a method of (for) forming (namely manufacturing) an apparatus, such as the apparatus 100, 300. Accordingly, the method (with respect to the apparatus 300) further includes creating the pair of mutually opposite holes 324a, 324b on the at least one cover member 304; in other words, the holes 324a, 324b are disposed on mutually opposite sides of the cover member 304 as shown in FIG. 3. Furthermore, the method includes inserting the intermediate perforated tube arrangement 322 into the pair of mutually opposite holes 324a, 324b for being supported by the intermediate filter 310.

In an embodiment, the present disclosure also provides a kit for growing plants, for example aforesaid plants. Specifically, the kit includes an apparatus, such as the apparatuses 100, 300, and a bag (not shown) for accommodating and carrying the apparatus in an unassembled state thereof. The kit is designed for purposes of helping when transporting the apparatus. In one embodiment, the bag of the kit is made to accommodate components which can be assembled to form the apparatuses 100, 300 (shown in FIGS. 2 and 3). Alternatively, the bag may be made to accommodate components which can be assembled to form a plurality of apparatus, such as a plurality of the apparatus 100, 300 shown in FIGS. 2 and 3. Alternatively, the bag may be a single large unit of apparatus, for example a plurality of apparatus that are couplable (namely attachable) together to from an array of apparatus.

As aforementioned above, in one example embodiment, an apparatus (not shown) of the present disclosure may include a plurality of base members, a plurality of cover members, a plurality of intermediate filters, a tubular member, a plurality of lids, a plurality of handles and the like. In other words, such apparatus may be a combination of apparatus 100, 300, disclosed hereinabove. For example, a plurality of apparatus 100 (or 300) may be coupled to each other for forming such apparatus. In such instance, the apparatus 100, 300 (as disclosed herein above) may further include fastening means, such as hooks, ropes and the like, for coupling the apparatus with each other. Such apparatus may be used for larger areas and for large production of, for example, fruits and vegetables. Furthermore, the production may be associated with either one category of a fruit or a vegetable, or multiple categories of fruits and vegetables. In countries where such plants are legally permitted, the apparatus is beneficially use for manufacturing high-value crops such as marijuana (Cannabis) and similar, for example in dry arid conditions. Medicinal plants are also beneficially grown using the apparatus, for example Japanese Knotweed (a rich source of antioxidant trans-resveratrol) and similar. Trans-resveratrol is very suitable medicinal material to consume to reduce metabolic damage from ambient radiation encountered from accident regions such as Fukushima Dai'ichi (Japam), Chernobyl (Ukraine), Hanford (USA) and Mayak (Russian Federation).

The apparatus of the present disclosure enables plants to be suitably grown (for example, fruits or vegetables, or both) and to meet the desired production of fruits or vegetables for an increasing human population. The handles of the apparatus 100, 300 enable convenient lifting and carrying of the apparatus 100, 300 from one place to another place. The tubular members enable watering to be achieved in an efficient manner, namely for watering the seeds or roots of the plants. Furthermore, the apparatus may be suitably used in small and large numbers, for example in groups of 10 apparatus, in large arrays of 1000 apparatus and so forth, based on availability of space. Moreover, the lid of the apparatus enables plants to be protected, namely saved, from harsh weather condition and external agents, such as bird or animal attacks, and may enable a desired temperature to be maintained inside the apparatus for growing plants. In addition, the apparatus and the method described in the present disclosure are easy to install and implement. Furthermore, the apparatus of the present disclosure is very efficient in its utilization of water, and may enable the growth of plants with significantly reduced water requirements; for example, arid locations along coastlines can be made productive by employing seawater for plant watering purposes, as will be elucidated in greater detail below. For example, the apparatus described herein may enable growth of plants by using approximately 75% less water as compared to conventional apparatus of substantially similar physical size. Moreover, the disclosed apparatus allows for using salt water (for example, such as sea water) for growing plants, thereby avoiding a need to employ expensive desalination equipment. In such an example, the salt may be captured in the at least one intermediate filter of the apparatus. Therefore, as aforementioned, such an apparatus can be efficiently utilized for cultivation in coastal areas having abundant salt water. Furthermore, the apparatus allows for growing plants faster than in corresponding conventional known apparatus. For example, by employing the aforementioned apparatus of the disclosure, a rate of growth of a given plant is susceptible to being increased by up to 35% compared to a rate of growth of the given plant by employing aforementioned conventional apparatus.

On account of the apparatus 100, 300 being susceptible to being dismantles, they are easier to repair, modify and recycle. On account of their modular manner of construction, when recycling, new apparatus 100, 300 can be constructed from selective recycling of parts from pervious apparatus 100, 300. Such recycling and reuse is highly efficient with regard to resource utilization and environmental impact.

When irrigated with sea water, the apparatus 100, 300 are susceptible to being used for cultivating plants such as coriander, courgettes, spinach and radishes. Beneficially, an additional layer of sand and filter fabric is added to protect roots of plants growing in the apparatus 100, 300 to come into direct contact with sea water. In operation, it would appear that salt water at a bottom region of the apparatus 100, 300 and recondenses at relatively high regions of the apparatus 100, 300 to provide fresh water irrigation to the plants. For example, condensate water formed on an underside surface of the lid 180, 312 is found to be devoid of salt. As a result, salination of the bottom region of the apparatus 100, 300 occurs, eventually requiring a replacement of contents of the apparatus 100, 300, for example for recycling purposes.

In certain implementations, the apparatus 100, 300 is found, from practical trials, to provide for plant cultivation with as little as 25% of the water irrigation requirement of conventional known grow bags. Moreover, such efficient irrigating water utilization occurs concurrently with a 25% to 35% faster plant growth rate compared to conventional known grow bags (namely "traditional grow bags").

Attachment of component parts of the apparatus 100, 300 is optionally achieved using sewing of parts, heat welding, double-sided adhesive tape and similar, for example as aforementioned.

It will be appreciated that aforementioned perforated tubular members can be implemented using a woven fabric, wherein gaps in the weave effectively function as perforations. Moreover, the aforementioned filter layers can be made thicker to prevent ingress of sea water to plant roots when the apparatus 100, 300 are irrigated with sea water. Similar considerations apply, mutatis, mutandis, when contaminated water, for example containing non-volatile toxins, are employed to irrigate the apparatus; non-volatile toxins include, for example oil and petroleum residues. Aforementioned funnels are optionally stitched, or otherwise attached, to an upper region of the apparatus 100, 300 for convenience of use.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for growing plants comprising:
   at least one base member having a periphery;
   at least one cover member having at least one channel;
   wherein the at least one cover member are couplable to the periphery of the at least one base member for providing a hollow space, and wherein the at least one channel is operable to receive at least one tubular member supported at a distance from the at least one base member; and
   at least one intermediate filter operable to be supported by the at least one cover member, wherein the at least one intermediate filter is arranged for dividing the hollow space into at least two segments,
   wherein the at least one cover member comprises a first sheet and a second sheet, wherein the first and second sheets are couplable along at least their lateral peripheral edges for forming the at least one channel therebetween,
   wherein the second sheet comprises at least one corner-cutout portion for creating at least one opening for a bottom portion of the at least one tubular member when received within the at least one channel.

2. The apparatus according to claim 1, wherein the at least one intermediate filter comprises a filter layer for dividing the hollow space into at least two segments.

3. The apparatus according to claim 1, further comprising an intermediated perforated tube arrangement having
   a perforated tube, and
   a perforated sleeve operable to receive the perforated tube therein,
   wherein the intermediated perforated tube arrangement is snugly received by a pair of opposite-holes of the at least one cover member and supported by the intermediate filter.

4. The apparatus according to claim 1, wherein the first and second sheets have a length that is at least 10% longer than a peripheral length of the at least one base member for allowing overlap of the lateral peripheral edges of the first and second sheets.

5. The apparatus according to claim 1, wherein the at least one cover member further comprises a plurality of through-holes, wherein the plurality of through-holes are configured at a distance from the at least one base member.

6. The apparatus according to claim 1, wherein the at least one base member has a circular or an oval or a polygonal shape.

7. The apparatus according to claim 1, wherein the at least one cover member and the at least one base member are made of a permeable material.

8. The apparatus according to claim 7, wherein the permeable material comprises one of a woven fabric and a non-woven fabric.

9. The apparatus according to claim 1, wherein the at least one cover member is made of an impermeable material.

10. The apparatus according to claim 9, wherein the impermeable material comprises one of a plastics material, leather, and rubber.

11. The apparatus according to claim 1, wherein the at least one intermediate filter is a mesh made of a metal or a plastics material.

12. The apparatus according to claim 1, further comprising at least one lid couplable to the at least one cover member for closing and opening the hollow space, wherein the lid and the at least one cover member comprises a fastening arrangement for coupling the least one lid to the least one cover member.

13. The apparatus according to claim 1, further comprising one or more handle arranged on the at least one cover member for lifting and carrying the apparatus.

14. The apparatus according to claim 1, further comprising at least one funnel member operable to be arranged on the at least one tubular member.

15. The apparatus according to claim 1, further comprising at least one slug repellent arranged on the cover member.

16. The apparatus according to claim 1, wherein the apparatus is operable to provide irrigation of one or more plants growing therein from seawater supplied to a bottom region of the apparatus.

17. A method of forming an apparatus for growing plants, the method comprising steps of:
   coupling overlapped lateral peripheral edges of first and second sheets of at least one cover member to form at least one channel therebetween;
   coupling the at least one cover member to a periphery of at least one base member to extend from the at least one base member and to form a hollow space;
   inserting at least one tubular member through the at least one channel such that the at least one tubular member is snugly received by the at least one channel with a corner-cutout portion of the second sheet creating at least one opening for a bottom portion of the at least one tubular member and the at least one tubular member supported at a distance from the at least one base member; and
   coupling at least one intermediate filter to the at least one cover member for being supported by the at least one cover member and arranged within the hollow space to divide the hollow space into at least two segments.

18. The method according to claim 17, further comprising coupling the at least one lid to the at least one cover member, and coupling the one or more handle to the at least one cover member.

19. A method of using an apparatus for growing plants, the method comprising steps of:
   providing an apparatus for growing plants comprising:
      at least one base member having a periphery;
      at least one cover member having at least one channel;
      wherein the at least one cover member are couplable to the periphery of the at least one base member for providing a hollow space, and wherein the at least one channel is operable to receive at least one tubular member supported at a distance from the at least one base member; and
      at least one intermediate filter operable to be supported by the at least one cover member, wherein the at least one intermediate filter is arranged for dividing the hollow space into at least two segments;
      wherein the at least one cover member comprises a first sheet and a second sheet, wherein the first and second sheets are couplable along at least of their lateral peripheral edges for forming the at least one channel therebetween;
      wherein the second sheet comprises at least one corner-cutout portion for creating at least one opening for a bottom portion of the at least one tubular member when received within the at least one channel;
   filling a segment, closed to the at least one base member, of the hollow space with at least small stones and sand;
   placing the intermediate filter on top of the at least small stones and sand;
   filling a segment, away from the at least one base member, of the hollow space with at least soil and fertilizer; and planting seeds in the segment filled with the soil and fertilizer.

20. A method according to claim 19, wherein the method includes arranging for the apparatus to be provided with irrigation of one or more plants growing therein from seawater supplied to a bottom region of the apparatus.

\* \* \* \* \*